Feb. 5, 1963  K. E. HUMBERT, JR  3,076,551
FILTER SEALING MEANS
Filed March 22, 1960
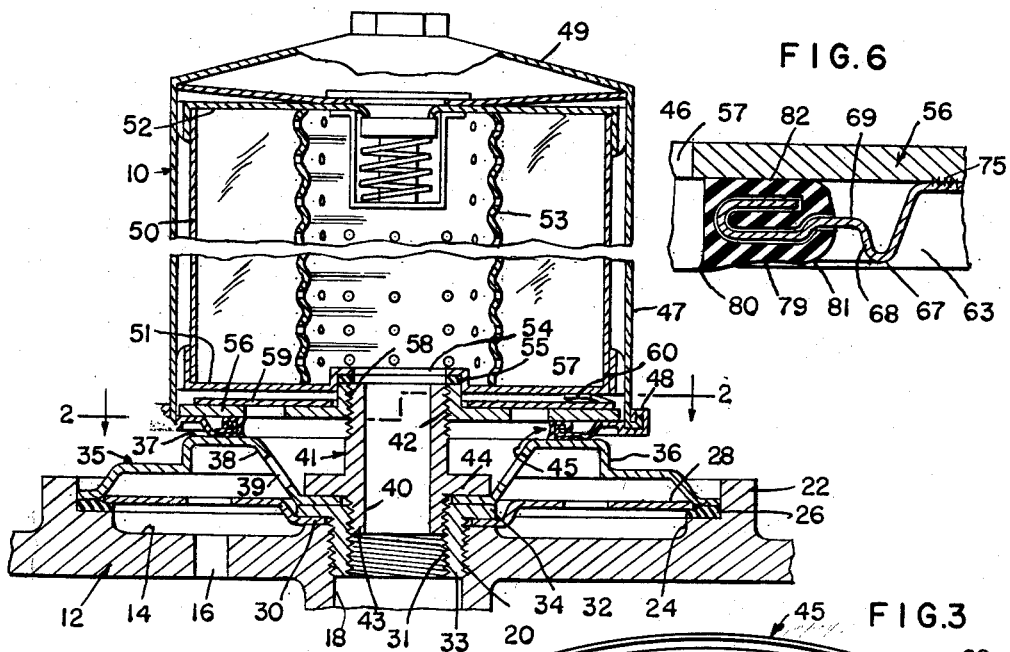
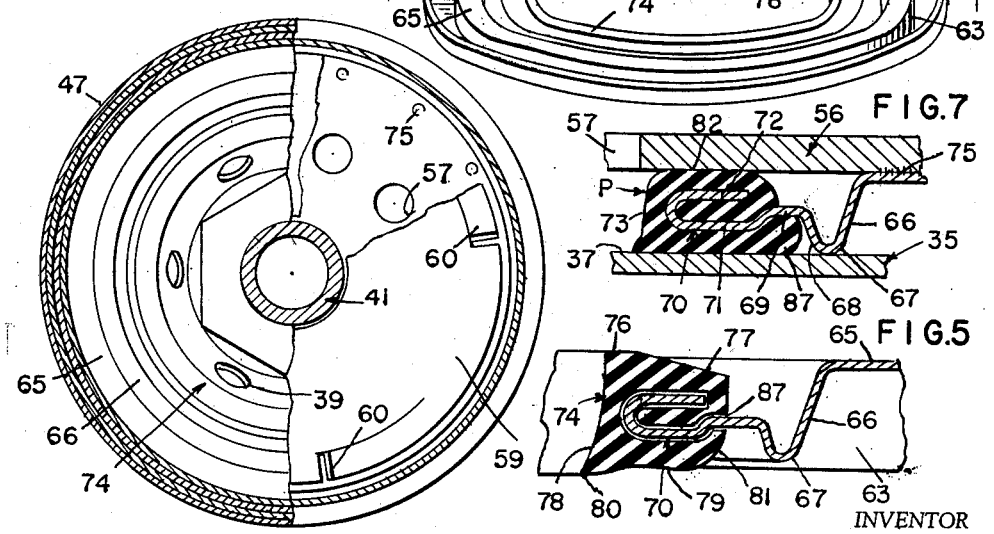
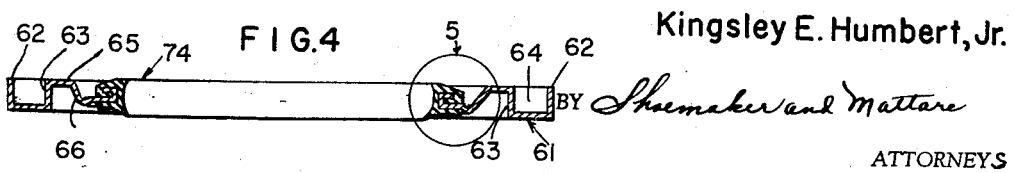
INVENTOR
Kingsley E. Humbert, Jr.
BY Shoemaker and Mattare
ATTORNEYS

United States Patent Office 3,076,551
Patented Feb. 5, 1963

3,076,551
FILTER SEALING MEANS
Kingsley E. Humbert, Jr., Gastonia, N.C., assignor to Wix Corporation, Gastonia, N.C., a corporation of North Carolina
Filed Mar. 22, 1960, Ser. No. 16,709
1 Claim. (Cl. 210—232)

This invention relates generally to improvements in seals and is directed primarily to improved sealing means for use in association with certain types of filter units but is not necessarily restricted to such use and may have wider applications.

Filters used in association with lubricating systems, particularly automotive lubricating systems, are in a majority of cases presently designed so as to be readily placed or installed in the system and such filters are in the trade referred to as "spin-on" filters, one example of which is illustrated in co-pending application Serial No. 622,477. In the structure illustrated in this application an end wall of the filter unit is provided with a seal interposed between the wall and a member with which the filter casing wall is joined, such seal functioning to prevent leakage of oil as it passes from the oil system into the filter unit and also being so constructed as to resist blow-out under pressure applied thereagainst from the inside.

At the present time the sealing element interposed between the end wall of the filter unit and the member with which it is coupled is joined to such wall in such a manner as to involve certain disadvantages among which are the possibility of the sealing element being torn loose from the wall to which it is attached by excessive forcing of the unit in screwing it into position or mashing the sealing element to an undesirable extent also as a result of such forcing.

In view of the foregoing it is a primary object of the present invention to provide a new and novel type of seal for a filter unit whereby the foregoing disadvantages are overcome.

It is another object of the present invention to provide a new and novel sealing element embodying a yieldable annulus or gasket and carrier therefor wherein a novel means is provided for bonding the annulus or gasket to the supporting body.

A still further object of the invention is to provide a new and novel means of bonding a sealing material to a thin metal carrier or plate, such as would form an end wall of the filter element receptacle for a filtering unit of the type referred to, to effectively hold such gasket against separation from the plate, in other words, against blow-out, by fluid pressure imposed against the inwardly facing surface of the sealing material.

Still another object of the invention is to provide a novel means of coupling or bonding an elastic sealing material with an edge or periphery of a thin metal annulus in such a manner that the sealing material will be protected from damage after being brought into contact with an opposing or mating surface by a rotary action such as would occur in connection with the threadable coupling of a filter element with a threaded mounting stud.

More particularly it is an object of the invention to provide a new and novel seal embodying an annular plate and a body of elastic material wherein the elastic material is joined to an edge of the annular plate in such a way that relative movement may be obtained between the plate and the elastic material under those circumstances where an effort might be made to continue a rotary movement of the annular plate after the elastic material carried thereby has been compressed between two opposing surfaces, so that scuffing of the elastic sealing material or its complete separation from the carrying plate will be avoided.

The invention will be best understood from a consideration of the following detail description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claim.

In the drawing:

FIG. 1 illustrates the application of the present invention to or its incorporation in the body of a spin-on type filter unit of the construction disclosed and claimed in my co-pending application hereinbefore referred to, the unit being broken away transversely between its ends and further showing the unit attached to a threaded mounting stud and held in working relation with an adapter or mounting plate;

FIG. 2 is a sectional view taken transversely of the structure shown in FIG. 1 on the two parallel offset planes designated by the lines 2—2 and showing a portion of the spring-pressed valve disc broken away to show a part of the underlying stiffening plate;

FIG. 3 is a view in perspective of the gasket as formed preparatory to its application to the end of the filter unit seal to form the end closure wall thereof, the view looking toward the inner side of the gasket;

FIG. 4 is a sectional view taken substantially on the line 4—4 of FIG. 3;

FIG. 5 is a detail view on an enlarged scale of the portion of the structure shown in FIG. 4 enclosed in the circle 5;

FIG. 6 is a detail view on an enlarged scale corresponding to FIG. 5 and showing the upper side of the elastic portion of the gasket pressed against a portion of the filter unit stiffening plate to which the gasket is permanently attached;

FIG. 7 is an enlarged detail view corresponding to FIG. 6, but showing the elastic portion of the gasket compressed between a portion of the filter unit stiffener plate and a portion of a cooperating or mating adapter plate.

Referring now more particularly to the drawing, the numeral 10 generally designates a filter unit of the "spin-on" type. The middle portion of this unit has been broken away to facilitate making other parts on a sufficiently large scale to show important details of the invention.

The invention of the present application is illustrated as forming an integral part of this filter unit and this unit is of the general type illustrated in co-pending application, hereinbefore referred to, but it is to be understood that it is shown only for convenience in illustrating the use of the gasket structure and not with any intention of limiting the invention since it will be readily obvious that the gasket structure may form a part of spin-on type filter units of a form different from that here illustrated and in fact such gasket structure may have other applications than its use with a filter structure. Therefore, it will be understood that while the following descriptive matter will be directed to the filter and the mounting therefor, there is no intention to limit its use to such an association, as above stated.

The numeral 12 generally designates a portion of the block or oil housing part of an internal combustion engine of a form or construction employed in certain types of motor vehicles, wherein there is provided in the lower portion of the engine block a circular oil receiving recess or sump 14 into which the oil outflow passage 16 opens. In the central part of this recess portion or sump is the oil inflow port 18 which is screw threaded as indicated at 20 for the purpose about to be described.

The sump 14 is defined by the annular flange 22 and the inner side of this flange is formed with the annular shoulder 24 which forms a seat for a gasket 26.

The numeral 28 generally designates a conventional thin baffle plate, the perimeter of which rests upon the gasket 26 as shown, while the central portion is slightly depressed as indicated at 30 and is centrally apertured as at 31 to align with the port 18 and the plate is provided with a number of oil passing apertures 32.

The numeral 33 designates an interiorly and exteriorly threaded coupling sleeve which is flanged as indicated at 34 and which flange bears upon the part 30 of the baffle plate to maintain the same in position.

The numeral 35 generally designates the improved adapter plate disclosed and claimed in the co-pending application hereinbefore referred to. This adapter plate is of the proper diameter to fit within the flange 22 and rests upon the plate 28.

Inwardly of the perimeter portion of this plate which rests on the plate 28 over the gasket 26 the adapter plate has an annular elevated portion which is generally designated 36 and which provides an annular flat top surface 37 upon which the gasket hereinbefore described, which forms a part of the bottom wall of the filter containing receptacle of the unit 10, bears when the filter unit is mounted in operative position.

Inwardly of the annular surface 37 the adapter plate is depressed to form the inverted frusto-conical wall portion 38 through which oil-passing apertures 39 are formed and the center of this frusto-conical portion is apertured as indicated at 40 for alignment with the sleeve 33, the center portion of the adapter plate around the opening 40 resting upon the top of the sleeve flange 34.

The numeral 41 generally designates the filter mounting stud which is tubular or in the form of a nipple having a threaded upper end portion 42 and a threaded lower end portion 43 separated from the upper portion by the surrounding flange 44. The lower threaded portion 43 of the stud engages, as shown, in the sleeve 33 while the exteriorly threaded upper end 42 is adapted to be engaged as hereinafter described, by a threaded portion of the filter unit whereby the filter unit is maintained in mounted position on the adapter plate 35.

The gasket of the present invention is generally designated 45 and is shown in FIG. 1 in association with or as forming a part of the filter element encasing container or housing which latter is designated 46.

As incorporated in the structure of the filter element housing 46 the gasket 45 forms the inner end wall or inner end closure for such housing and by reason of its construction makes possible the employment of thin metal for such wall.

The gasket is shown as hereinbefore stated in FIGS. 3 and 4 in the form in which it is initially prepared ready for application and attachment to the open end of the receptacle wall 47 by a conventional rolled seam 48.

While the filter unit within the container or receptacle 46 as well as the container may be of any desired form or construction, capable of having the wall forming gasket a part thereof, the structure here illustrated comprises in addition to the container 46 which has the outer end thereof closed by the integral outer end wall 49, a filter element which is generally designated 50 and is in the form of a longitudinally pleated tubular body secured between inner and outer end plates 51 and 52 respectively and having a central reinforcing and apertured sleeve 53 extending axially therethrough.

The plate 51 has a flanged opening 54 in the central part thereof, the flange being designated 55 for sealing connection as hereinafter stated, with the inner end wall stiffening plate which is generally designated 56. This stiffening plate 56 has oil passing openings 57 formed therethrough and is formed with a central internally threaded neck 58 for threaded connection with the outer end 42 of the stud 41. When so connected with the stud the flange 55 is in sealing connection with the inner end of the neck 58.

Interposed between the plate 51 and the stiffening plate 56 is a thin metal anti-drain-back valve disc 59 which is formed with a plurality of resilient or spring fingers 60 which bear against the outer side of the plate 51 and normally press the valve disc into closed position over the openings 57.

All of the foregoing features relating to the construction of the filter unit here shown and the mounting or adapter plate and stud are disclosed and claimed in the copending application hereinbefore referred to.

The gasket structure as prepared for application to the bottom end of the filter body receptacle 47 comprises a thin metal annular plate 61 formed around the outer periphery with the upturned flange 62 in concentric relation with an inner wall 63 whereby there is formed the channel 64 for facilitating the formation of the rolled seam 48 between the outer periphery of the plate and the bottom edge of the receptacle 47 in the manner illustrated in FIG. 1. The annular wall portion 61 merges at its top edge with a flat annular portion 65, the surface of which extends radially inwardly and the inner edge of this annular portion joins a downwardly and inwardly angled web 66 and the web at its lower edge is then reversely curved as indicated at 67 to extend upwardly and inwardly in the short inner web portion 68. The two web portions 66 and 68 thus in cross section form a V and the top edge of the shorter inwardly and upwardly extending web portion is then extended radially inwardly as indicated at 69 and joins the turned back inner peripheral portion of the annulus designated 70 and which in cross section is in the form of a hook having the two opposite side portions 71 and 72 joined by the intermediate portion 73. This hook is actually a circumferential reversing of the metal as is most clearly shown in FIGS. 5, 6 and 7.

Encasing or enclosing the hook-like inner peripheral portion or circumferential portion 70 of the plate is a molded sealing collar, or annulus, which is generally designated 74, formed of natural or synthetic rubber or any other suitable elastomer. This collar in effect forms the actual sealing element of the gasket structure or in effect may be defined as the gasket which is mounted upon and joined against detachment from the annular thin metal carrier plate 61.

In the use of the structure illustrated in FIGS. 3 and 4 as the end closure wall of the filter housing 47, and which structure is generally designated 45 and generically termed the gasket, the filter casing stiffener plate 56 is mated against the annular surface 65 and welded thereto as indicated at 75. Also it will be seen upon reference to FIG. 1 that the parts 45 and 56 are dimensioned so that the outer edge of the stiffener plate 56 terminates adjacent to or inwardly of the wall 63 and the inner side of the molded sealing collar 74 is located just outside the circular series of fluid passing openings 57.

Referring now to the enlarged detail views forming FIGS. 5, 6 and 7, it will be seen upon reference particularly to FIG. 5 that the molded sealing collar 74, in its preferred form, or cross sectional contour, when it is not under compression, has a flat top inner surface 76 which merges with or joins a sloping or downwardly inclined top outer surface portion 77. The inner side or interior wall of the sealing collar, which is designated 78, is substantially straight from the top surface of the collar but may curve slightly inwardly near the bottom of the collar and the bottom or under surface 79 is preferably slightly inwardly pressed or concaved in transverse section whereby it joins the inwardly curved bottom portion of the wall 78 in a way to form the relatively sharp edge 80. The outer bottom corner of the annular collar is slightly rounded and forms the corner rib 81 which parallels the edge 80.

Referring again to FIG. 5, it will be seen that when the resilient molded sealing collar 74 is in uncompressed condition, the outer side of the reversely curved portion 67 of the metal plate will lie in a plane perpendicular to the axial center of the gasket slightly offset from the planes of the edge 80 and rib 81 or inwardly from such planes. This reversely curved portion 67 has a dual function in that it acts as a positive stop or annular foot whereby the gasket can only be compressed a predetermined amount as will be hereinafter more clearly pointed out and it acts as a barrier for limiting radial spreading of the gasket under pressure and coacts with the hook in holding the gasket against blow-out.

Also in the uncompressed condition of the collar the top surface portion 76 lies in a plane slightly above the top of the flat annular part 65 and thus when the metal plate portion of the gasket is placed against the underside of the stiffener plate 56 and welded thereto, the top of the sealing collar will be flattened to form a close or tight seal with the plate 56 as shown in FIGS. 6 and 7 at 82.

FIG. 7 illustrates the condition of the gasket sealing collar when the gasket is installed against the sealing surface 37 of the adapter plate 35. This view also illustrates the dual function of the stop or annular foot to prevent excessive compression of the collar between the plate 56 and the surface 37 and hold the material against excessive radial flow under pressure from within the area circumscribed by the collar.

It will also be apparent from FIG. 7 how the annular corners 80 and 81 function to form a perfect sealing engagement with the surface 37 since these ribs will be compressed and spread apart so that the entire surface 79 or substantially all of this surface will be flattened as indicated at 87. Thus it will be apparent that when the foot of the plate represented by the curved portion 67 comes against the sealing surface 37, the filter unit, threaded onto the stud 41 in the manner illustrated, can be turned or installed no tighter. Additionally, when the underside of the resilient sealing collar is pressed against the sealing surface 37, the inner edge 80 will tend to slide inwardly as the upwardly bowed surface 79 flattens out so that such edge 80 has a squeegee action to assure a close sealing connection with the surface 37 and the flattening of the previously bowed surface 79 causes that surface to grip the surface 37 with a suction effect.

In FIG. 7 the arrows P denote the pressure acting against the gasket by the pressurized fluid passing to the openings 57 of the filter. It will be apparent that this pressure acts against the gasket sealing collar in a manner which will tend to drive the elastic collar into whatever space may be left between the stop 67 and the sealing surface 37. These arrows show in a general way the direction of forces acting against the gasket from within the area circumscribed by the inner surface of the sealing collar and it is clear that the elastic collar cannot be driven through any space between it and the stop 67 because the hook or turned edge portion 70 in the metal so holds the collar material that it cannot rotate around itself and be extruded at the offset or stop 67.

A particular advantage of the present gasket structure resides in the fact that the gasket collar or the elastic portion of the gasket is molded in place on the lid or thin metal plate which forms the wall for the filter casing. In this operation the thin metal plate or collar carrier or holder is positioned between the two opposing or mating parts of the mold in which the elastomer collar is shaped and the elastomer material is extruded into the cavities and around all of the metal in the area of the portions 69 to 73, which extends into the mold cavities. This immediately eliminates any need for glue or hand fastening of the gasket collar since the latter is positioned in place on its supporting body or holder at the same time that it is being molded or manufactured. Accordingly it will be seen that as the cover or end wall which is provided by the gasket plate 61 is being put on the oil filter casing, the gasket is simultaneously installed.

Another advantageous feature of the present invention resides in the fact that the desired strong seal between the heavy stiffening plate 56 and the thin metal end wall of the filter which the plate 61 provides, is obtained without the use of or need for a sealing compound since the elastic sealing collar forms the required effective seals in the areas 82 and 87. Thus because of these distinct advantages the gasket cannot be misapplied or improperly installed because it is manufactured in place on the structure to which it is attached or, in other words, the sealing element cannot be improperly installed because it is formed initially on the inner periphery of the annular plate which forms the end wall of the filter element casing.

Another advantage in the present invention resides in the manner in which the sealing collar is molded to the carrier plate 61 so that the soft sealing collar material is protected against scuffing or being torn loose when it becomes compressed between the plate 56 and the surface 37 during the threaded attachment of the filter to the stud 41.

In this molding of the sealing collar to the part 70 the collar is merely molded around the hook-like part so that it is not bonded to the metal but is free therefrom as is exaggeratedly illustrated at 88 in FIG. 5. Thus when the filter unit is threaded onto the mounting stud to the point where the elastic collar becomes compressed between the plate 56 and the surface 37 the sealing collar will be free to permit the annular plate body to rotate relative thereto around the axis of the filter unit. Since gasket materials of the nature of the molded collar, particularly rubber and synthetic rubber, have what is known as "elastic memory," the gasket after being installed will assume or tend to assume the condition of least stress. With this ability to adjust circumferentially, the gasket material will resist scuffing on its sealing face if the sealing member or sealing surface 37 of the member happens to be unusually rough. In other words, if this condition exists, the gasket collar will merely stop while the thin metal holder rotates inside of it and the heavy threaded stiffener member 56 rotates against its back or top side in the area designated 82.

I claim:

A sealed filter unit for threading onto an engine block comprising a cylindrical casing having a bottom with a threaded central opening therein for discharging liquid therethrough, said bottom having a plurality of inlet openings disposed around said central opening for passing liquid to be filtered into said casing, an annular member secured to the outer surface of said bottom comprising a flat peripheral portion having a vertical V-shaped rib immediately inwardly thereof, the inner leg of said rib being shorter than the outer leg, a horizontally extending portion disposed inwardly of the rib and terminating in an offset reversed bent U-shaped portion, a resilient molded annular sealing gasket disposed on said U-shaped portion for relative rotation with respect thereto, said gasket having a portion extending into the bight of said U-shaped portion and thereafter extending above and around said U-shaped portion and below it to completely enclose it, said gasket thereafter extending into said offset, the inner radial surface of said gasket being concave in transverse section, the longitudinal thickness of said gasket being greater than the longitudinal dimension of said V-shaped rib, said gasket being disposed adjacent said bottom and radially outwardly of said inlet openings whereby said filter unit can be screwed onto an engine block without damage to it, and so the gasket forms a tighter seal when liquid pressure acts on it, that will not blow out.

References Cited in the file of this patent
UNITED STATES PATENTS

| | | |
|---|---|---|
| 1,617,587 | Frumveller | Feb. 15, 1927 |
| 2,055,180 | Nelson | Sept. 22, 1936 |
| 2,659,617 | Cobb | Nov. 17, 1953 |
| 2,877,902 | Chase et al. | Mar. 17, 1959 |
| 2,888,141 | Coates et al. | May 26, 1959 |